United States Patent [19]
Voigt et al.

[11] Patent Number: 5,623,598
[45] Date of Patent: Apr. 22, 1997

[54] METHOD FOR IDENTIFYING WAYS TO IMPROVE PERFORMANCE IN COMPUTER DATA STORAGE SYSTEMS

[75] Inventors: Douglas L. Voigt; Marvin D. Nelson; Wade A. Dolphin, all of Boise, Id.

[73] Assignee: Hewlett-Packard Company, Palo Alto, Calif.

[21] Appl. No.: 343,809

[22] Filed: Nov. 22, 1994

[51] Int. Cl.$^6$ .............................. G06F 11/32; G06F 11/34
[52] U.S. Cl. ................ 395/184.01; 364/551.01; 395/140; 395/326
[58] Field of Search ............ 395/183.02, 184.01, 395/140, 155, 157, 161; 364/551.01

[56] References Cited

U.S. PATENT DOCUMENTS

| | | | |
|---|---|---|---|
| 4,410,763 | 10/1983 | Strawczynski et al. | 395/2.23 |
| 4,627,090 | 12/1986 | Smith, III et al. | 395/2.14 |
| 4,725,968 | 2/1988 | Baldwin et al. | 364/550 |
| 5,062,055 | 10/1991 | Chinnaswamy et al. | 364/551.01 |
| 5,155,835 | 10/1992 | Belsan | 395/425 |
| 5,195,100 | 3/1993 | Katz et al. | 371/66 |
| 5,237,658 | 8/1993 | Walker et al. | 395/200 |
| 5,261,086 | 11/1993 | Shiramizu | 395/183.02 |
| 5,276,877 | 1/1994 | Friedrich et al. | 395/650 |
| 5,278,838 | 1/1994 | Ng et al. | 371/10.1 |
| 5,287,462 | 2/1994 | Jibbe et al. | 395/275 |
| 5,289,418 | 2/1994 | Youngerth | 365/201 |
| 5,297,258 | 3/1994 | Hale et al. | 395/275 |
| 5,375,199 | 12/1994 | Harrow et al. | 395/159 |
| 5,506,955 | 4/1996 | Chen et al. | 395/183.02 |

*Primary Examiner*—Jack B. Harvey
*Assistant Examiner*—Sumati Lefkowitz

[57] ABSTRACT

A method is provided for identifying areas for performance improvement in data storage systems. The method includes the following steps: (1) sampling a performance metric during operation of the data storage system; (2) presenting to a user a performance history that is indicative of how the data storage system is performing over a period of time; (3) permitting the user to select an evaluation interval of the performance history; (4) determining whether the performance metric is at a level for desired performance of the data storage system for the selected evaluation interval; and (5) providing at least one suggestion to the user that would help improve performance of the data storage system in the event that the performance metric is not at the level for optimal performance.

16 Claims, 6 Drawing Sheets

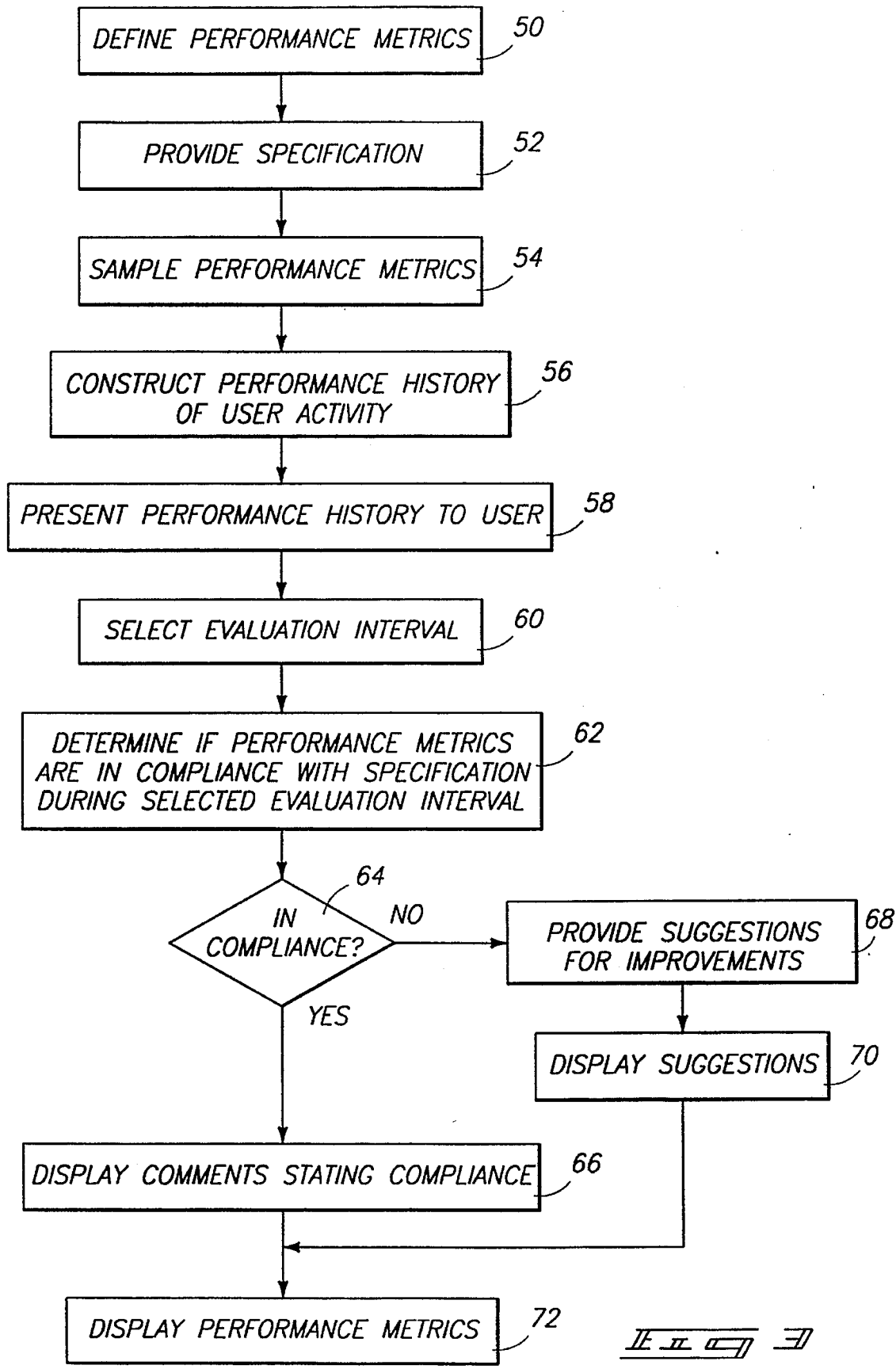

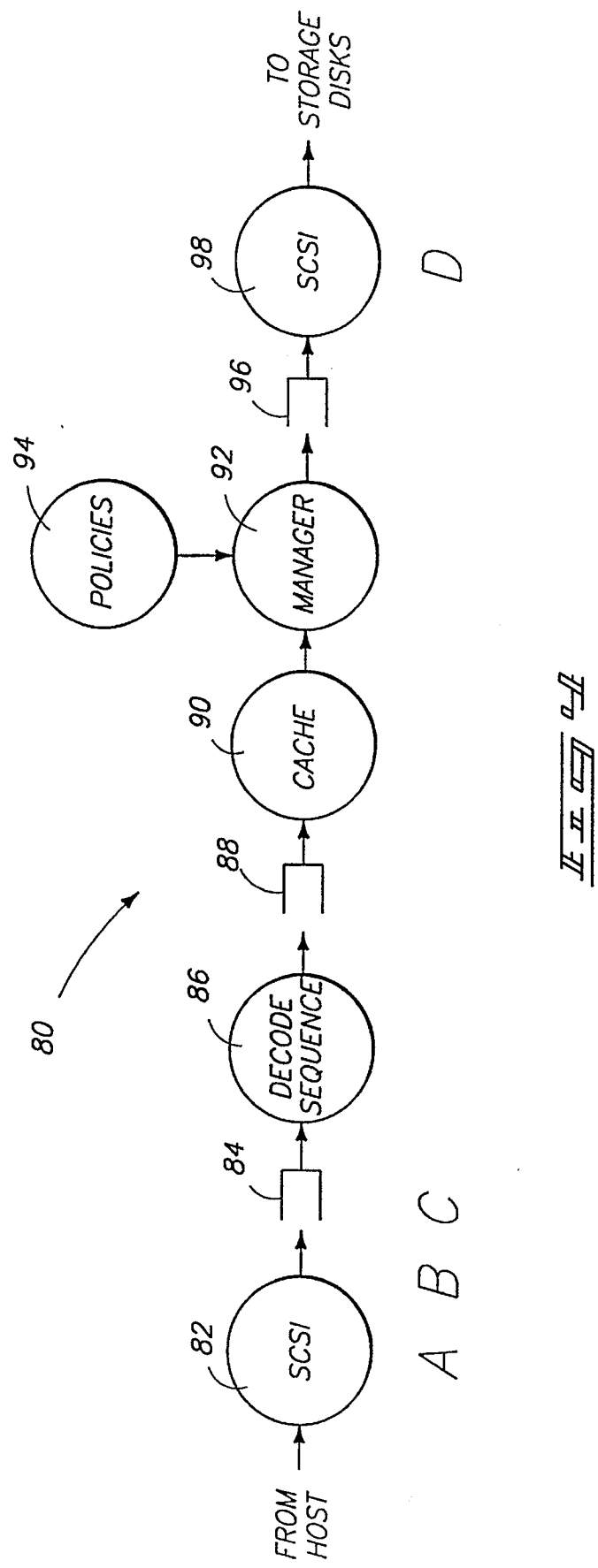

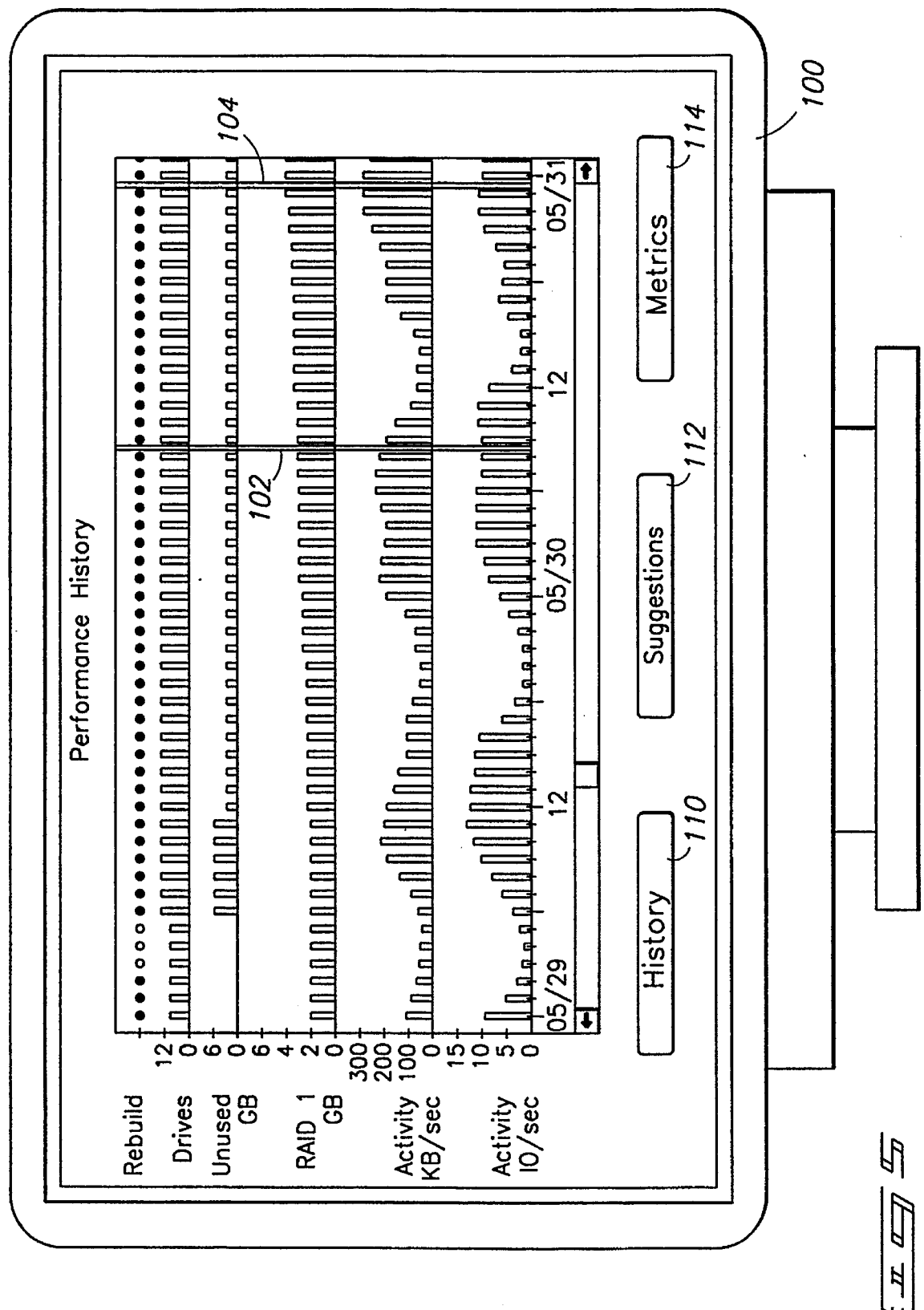

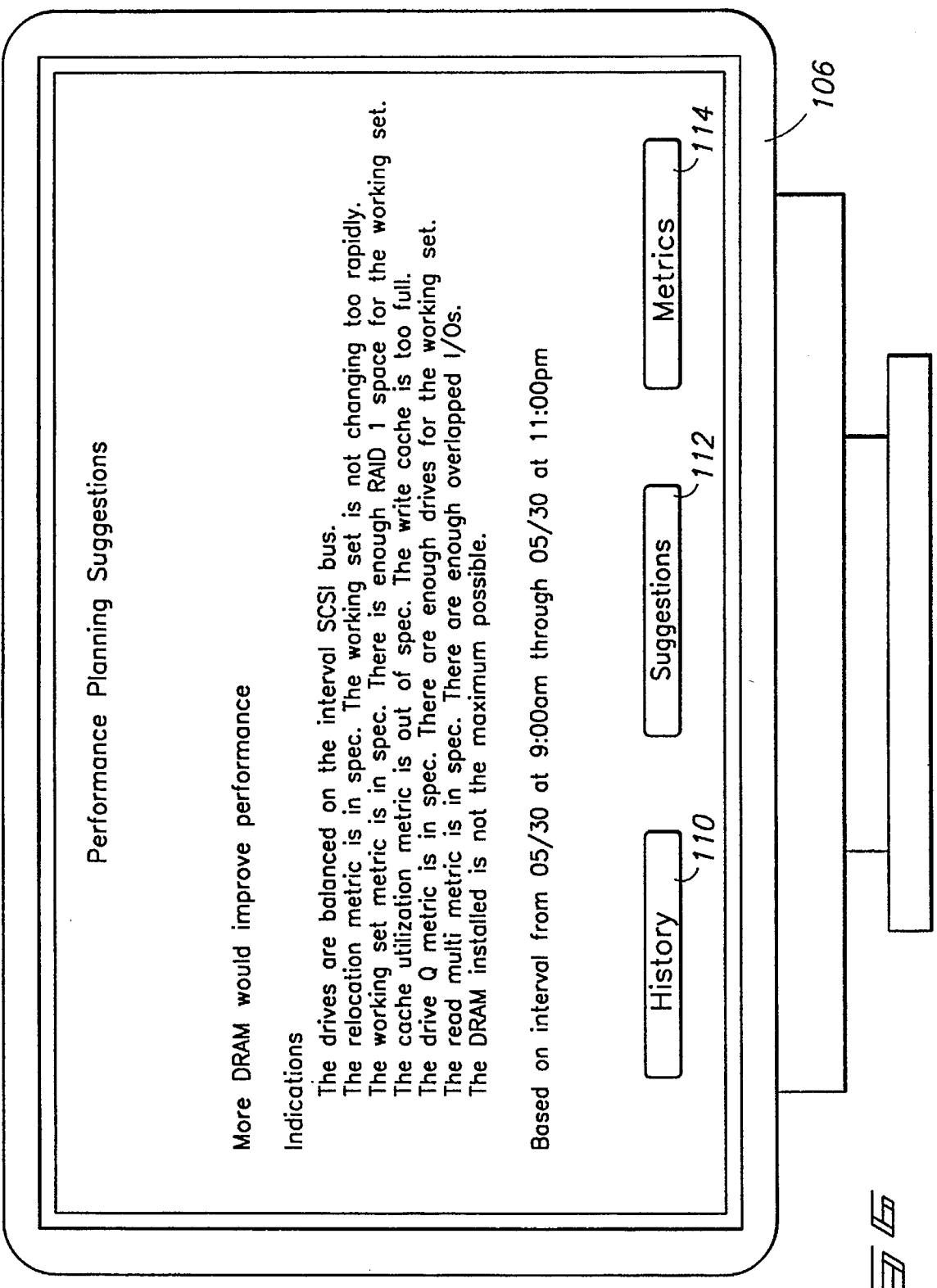

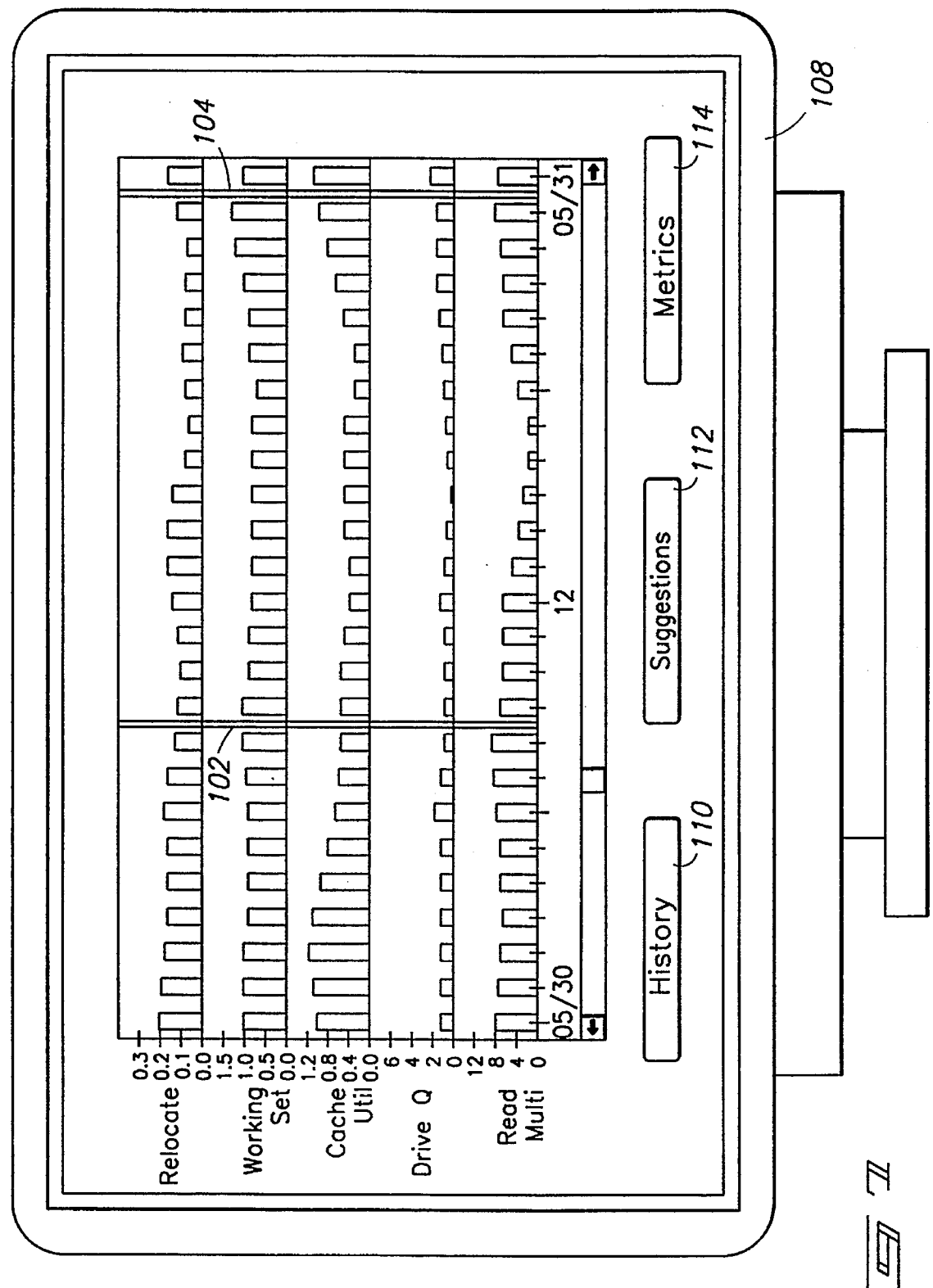

METHOD FOR IDENTIFYING WAYS TO IMPROVE PERFORMANCE IN COMPUTER DATA STORAGE SYSTEMS

FIELD OF THE INVENTION

This invention relates to data storage systems, such as disk array data storage systems, and methods for identifying techniques for improving their performance based upon demands imposed by a user.

BACKGROUND OF THE INVENTION

The performance of data storage systems inevitably varies over the course of a lifetime. Performance is affected by several different factors, including the types of components employed in the storage system, the operational settings, and a customer's storage requirements, such as capacity and I/O demand. As components fail or become over- or under-utilized, performance might suffer. If the operational settings are improper for the customer's storage configuration, performance might be degraded. If the customer imposes storage demands which are too rigorous for the present system, resulting in overburdening the storage system, performance will be adversely affected.

These performance-affecting factors vary during the life of the data storage system. Moreover, the factors might vary dramatically in the short term. When performance noticeably changes, the user is often tempted to make system alterations that are expected or believed to improve performance. However, the alterations might be based on perceived problems which are actually symptoms of a more fundamental hidden problem. This type of uninformed problem solving might lead the user to incur unnecessary costs and system down time without ever satisfactorily improving performance. For instance, the user might believe that adding another disk drive to the disk array would improve performance, when in reality, performance could be improved by simply reconfiguring the data storage system in a new manner which better accommodates the user's evolving storage demands.

It would therefore be advantageous to evaluate system performance during operation in an effort to monitor or anticipate situations which adversely impact performance. Once detected, the customer could then be alerted that the system is not performing optimally, and instructed as to what could be done to improve performance.

SUMMARY OF THE INVENTION

According to one aspect of this invention, a method is provided for identifying areas for improvement in a data storage system. Multiple performance metrics are defined which can be measured during operation of the data storage system. Example performance metrics include the total number of blocks read by the host, the total number of blocks written by the host, and the amount of time during which commands were outstanding from the host. A specification for the expected values of performance metrics is also provided. When the performance metrics are in compliance with the specification, the data storage system is operating at optimal performance.

According to this method, the performance metrics are sampled during operation of the data storage system. During operation, a performance history is constructed to indicate how the data storage system is performing over a period of time. The performance history examines the activities and storage demands imposed by the user, such as number of I/Os per second, memory transactions, used and unused memory space, etc. The performance history is presented to the user, preferably in the form of a graph which plots the activities and storage demands over time.

When inspecting the performance history, the user can select an evaluation interval for closer scrutiny. This is preferably accomplished by graphically overlaying an interval region on the performance history and then permitting the user to select the evaluation interval by graphically manipulating the interval region to overlay the desired time frame. For the selected evaluation interval, it can be determined whether or not any performance metric is in compliance with the specification. In the event that one or more performance metrics are not in compliance with the specification, one or more various suggestions are provided to help improve performance of the data storage system. The suggestions are chosen based upon which of the performance metrics are not in compliance with the specification.

Through the use of these suggestions, the user can make informed decisions on how to improve performance of the data storage system. The performance planning method of this invention also helps the user anticipate future storage requirements and timely upgrade the data storage system to accommodate them.

DESCRIPTION OF THE DRAWINGS

Preferred embodiments of the invention are described below with reference to the following accompanying drawings depicting examples embodying the best mode for practicing the invention.

FIG. 3 is a flow diagram depicting a method for identifying areas for performance improvement in the data storage system, FIG. 4 is a model illustrating data flow through the data storage system, and locations where performance metrics can be measured.

FIG. 5 is a visual screen display showing a performance history of the data storage system.

FIG. 6 is a visual screen display showing performance planning suggestions.

FIG. 7 is a visual screen display showing the measured performance metrics.

DETAILED DESCRIPTION OF THE INVENTION

This disclosure of the invention is submitted in furtherance of the constitutional purposes of the U.S. Patent Laws "to promote the progress of science and useful arts". U.S. Constitution, Article 1, Section 8.

The methods of this invention are described in the context of computer disk array data storage systems which employ multiple disk drives. However, the principles of this invention are applicable to other types of data storage systems, such as reel-to-reel storage systems, tape back-up systems, and CD storage systems.

Figure 1:
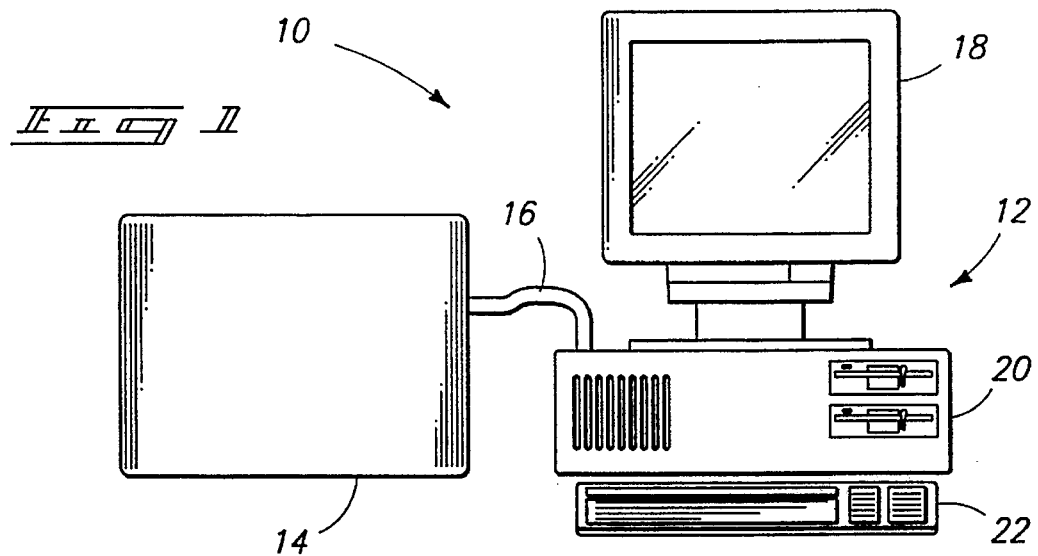
FIG. 1 is a diagrammatical illustration of a host computer station connected to a data storage system of this invention.

FIG. 1 shows a computer system 10 having a host computer terminal or station 12 connected to a data storage system 14 via I/O interface bus 16. Host computer station 12 includes a visual display monitor 18, a central processing unit (CPU) 20, and a keyboard 22.

Figure 2:
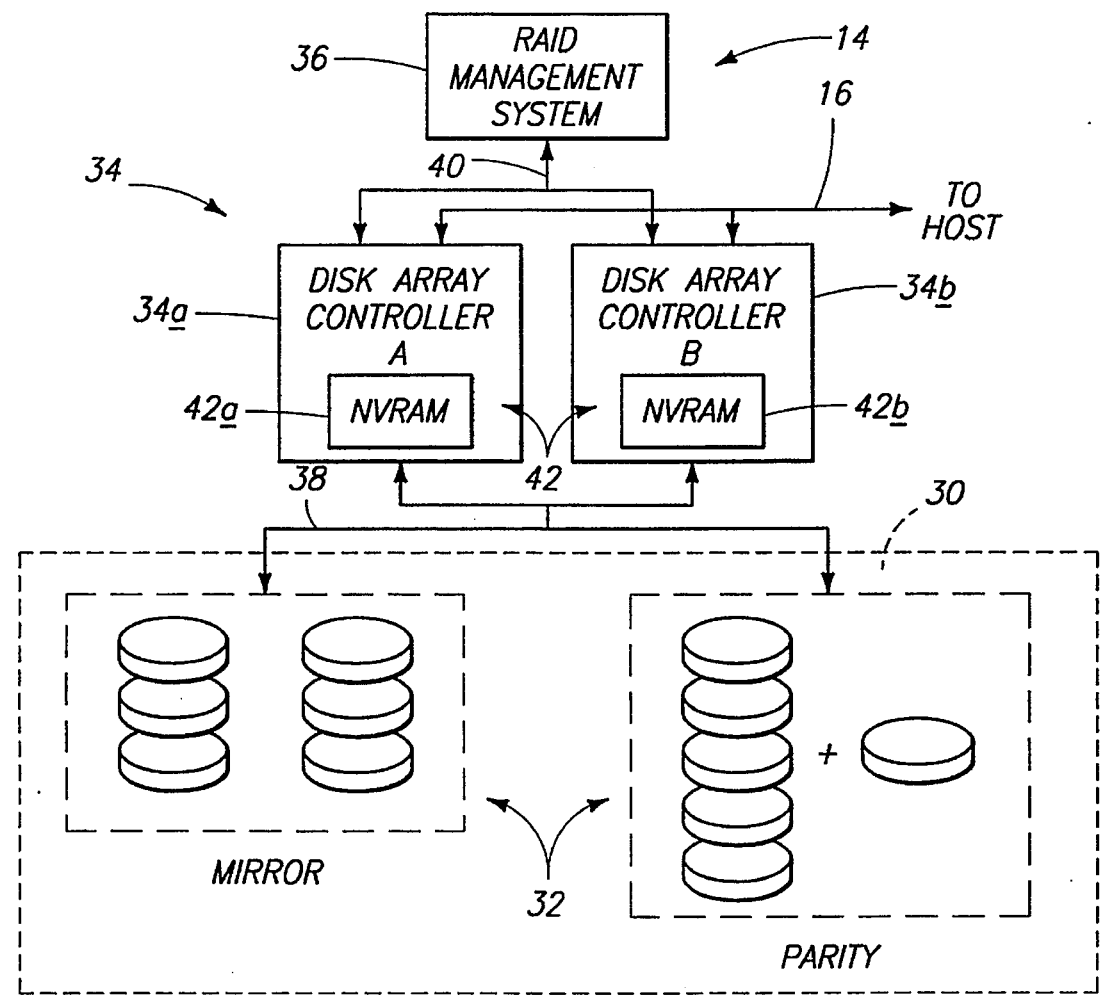
FIG. 2 is a block diagram of a data storage system embodied as a hierarchical disk array.

FIG. 2 shows an example construction of data storage system 14 embodied as a hierarchic disk array data storage system. Storage system includes disk array 30 having a plurality of storage disks 32, a disk array controller 34 coupled to the disk array 30 to coordinate data transfer to and from the storage disks 32, and a RAID management system 36.

The term "RAID" (Redundant Array of Inexpensive Disks) means a disk array in which part of the physical storage capacity is used to store redundant information about user data stored on the remainder of the storage capacity. The redundant information enables regeneration of user data in the event that one of the array's member disks or the access path to it fails. A more detailed discussion of RAID systems is found in a book entitled, *The RAIDBook: A Source Book for RAID Technology*, published Jun. 9, 1993, by the RAID Advisory Board, Lino Lakes, Minn.

Disk array controller 34 is coupled to disk array 30 via one or more interface buses 38, such as a small computer system interface (SCSI). RAID management system 36 is operatively coupled to disk array controller 34 via an interface protocol 40. The controller 34 is coupled to the host computer via I/O interface bus 16. RAID management system 36 can be embodied as a separate component, or configured within disk array controller 34 or within the host computer to provide a data manager means for controlling disk storage and reliability levels, and for transferring data among various reliability storage levels. These reliability storage levels are preferably mirror or parity redundancy levels, but can also include a reliability storage level with no redundancy at all.

The disk array controller 34 is implemented as a dual controller consisting of disk array controller A 34a and disk array controller B 34b. Dual controllers 34a and 34b enhance reliability by providing continuous backup and redundancy in the event that one controller becomes inoperable.

Storage disks 32 have example sizes of one to three Gigabytes. The storage disks can be independently connected or disconnected to mechanical bays that provide interfacing with SCSI bus 38. In one implementation, the data storage system is designed with twelve active mechanical bays. Four SCSI buses are used to interface these bays with disk array controller 34 (i.e., one bus per 3 mechanical bays). If the active bays are fully loaded, the data storage system has an example combined capacity of 12–36 Gigabytes.

The hierarchic disk array 30 can be characterizable as different storage spaces, including its physical storage space and one or more virtual storage spaces. These various views of storage are related through mapping techniques. For example, the physical storage space of the disk array can be mapped into a RAID-level virtual storage space which delineates storage areas according to the various data reliability levels. For instance, some areas within the RAID-level virtual storage space can be allocated for a first reliability storage level, such as mirror or RAID level 1, and other areas can be allocated for a second reliability storage level, such as parity or RAID level 5. The RAID-level virtual view can be mapped to a second application-level virtual storage space which presents a contiguously addressable storage space. The physical configuration and RAID view of the storage space are hidden from the application view, which is presented to the user.

A memory map store 42 provides for persistent storage of the virtual mapping information used to map different storage spaces into one another. The memory mapping information can be continually or periodically updated by the controller or RAID management system as the various mapping configurations among the different views change. The memory map store 42 is embodied as two non-volatile RAMs (Random Access Memory) 42a and 42b, such as battery-backed RAMs, which are located in respective controllers 34a and 34b. The dual NVRAMs 42a and 42b provide for redundant storage of the memory mapping information.

The storage disks provide a physical storage capacity which is available to the host computer for data storage. It is desirable that this capacity be managed effectively to optimize performance, both in terms of efficiency of operation as well as satisfying the storage demands imposed by the user. Performance management techniques of this invention are grounded in finding answers to difficult, imprecise questions which continuously evaluate how well the data storage system is performing. The following seven inquiries demonstrate an example set of performance decision making goals:

1. Is the data storage system a performance bottleneck?
2. Do current system configuration settings enable optimal performance? Example settings include SCSI transfer rate and size of the logical units.
3. Would rebalancing storage disks on four SCSI channels 38 improve performance?
4. Would larger, faster, or additional storage disks significantly improve performance?
5. Would additional RAM in the disk array controller 34 significantly improve performance?
6. Would additional data storage systems 14 significantly improve performance?
7. Would upgrading to a new generation of disk array controller 34 or storage disk 32 improve performance?

The first enumerated decision making inquiry indicates that something is affecting the system, although the source may be indeterminable. Inquiries 2–5 involve making changes to the existing data storage system. Inquiries 6–7 involve alterations which involve additional components, such as modifications made after the capacity of one data storage system is fully consumed.

Performance improvement questions are difficult to answer with absolute accuracy as they involve some degree of prediction. However, a complete quantitative estimation of performance parameters requires high storage and analytic processing costs. The methods of this invention therefore focus on utilization of the existing components in the data storage system. Utilization data helps isolate performance problems, and helps identify components that are operating well or poorly in their present configuration. The basic performance improvement strategy, then, is to invest in changes that will solve current problems, and not in changes to components that are already operating within specification.

The methods of this invention identify potential areas for performance improvement. The methods inform the user as to substandard performance, and generate suggestions which assist the user in rectifying the problems to return the system to optimal performance.

FIG. 3 shows the preferred steps of a method for identifying areas for performance improvement. The initial step 50 is to define one or more performance metrics that can be measured during operation of the data storage system.

Example performance metrics include the total number of blocks read by the host, the total number of blocks written by the host, the amount of time during which commands were outstanding from the host, and the maximum SCSI wait queue size per device. A specification which establishes the standards for the performance metrics is also provided (step 52). The data storage system is operating at optimal performance when the performance metrics are in compliance with the specification, or said another way, when the performance metrics are "in spec". The standards established by the specification may be in the form of acceptance or tolerance computations with thresholds for various performance metrics.

Once the performance metrics and corresponding specification are defined, the data storage system is equipped with means for monitoring the performance metrics. Such means is preferably implemented as firmware in the disk array controller 34 to extract component utilization data during operation.

Once a performance metric measurement means is installed, the next step 54 is to sample the performance metrics during operation of the data storage system. This sampling occurs in either the data storage system 14 or the host computer station 12. FIG. 4 shows an example model 80 of the controller firmware demonstrating the points at which performance metrics can be sampled. The circles represent stages of I/O processing and the three-sided boxes represent queues. The model shows information flow from the host computer through to the storage disks. Requests made by the host flow first into a front end SCSI 82, and are then temporarily held in host queue 84. Decoder 86 dissects the requests into smaller commands for further processing. The commands are placed in cache queue 88 until cache 90 is ready to accept them. Workload is transformed in hierarchic manager 92 in response to the RAID policies 94 regarding hierarchy and redundancy management. Flow continues to SCSI queue 96 which temporarily holds items for back end SCSI 98.

Performance metrics are extracted at various points along the model. For instance, the performance metric for the total number of blocks read by the host is extracted at point A in front end SCSI 82. The following table 1 lists the example performance metrics, the sample points for the performance metrics, and the decision affected by the performance metrics.

performance history involves those parameters reflecting use of the data storage system, including such parameters as the amount of available space, amount of consumed space, I/O demand, and the amounts of mirror and parity type storage. The performance history reveals how the data storage system is performing over a period of time. The construction of the performance history per step 56 can be conducted in either the data storage system 14 or the host computer station 12.

The performance history is then presented at the host computer station 12 to the user at step 58. Preferably, the performance history is graphically displayed on visual display screen 18 in FIG. 1.

FIG. 5 shows an example screen display 100 for performance history. More particularly, the performance of the data storage system in terms of unused memory capacity (measured in gigabytes), RAID level 1 type storage (measured in gigabytes), and I/O access activity (measured in both Kilobytes per second and I/Os per second) are provided over a three day period. Notice that the performance history shows considerable activity during daytime hours of 6:00 am and 12:00 pm. The displayed time period can be adjusted by the user.

Now suppose the user wants to evaluate one particular time period. For instance, the user might observe an abnormal glitch or trend in the performance history and wish to examine that period more thoroughly. Another example is that the user might wish to avoid periods of atypical usage while analyzing more normal periods. In either case, the user simply selects an evaluation interval by graphically manipulating an interval region, bounded by vertical lines 102 and 104, that is overlaid on the performance history graph (step 60 in FIG. 3). Each boundary line 102, 104 is independently slidable over the time scale provided at the bottom the screen. The depicted evaluation interval is from 9:00 am to 11:00 pm on May 30.

Once an evaluation interval is selected, the next step 62 (FIG. 3) is to determine whether any performance metric is not "in spec" within the selected evaluation interval. This determination is preferably conducted by a performance analysis utility resident in computer station 12. The determination of step 62 can be made in many different ways. One approach is to average the samples for each performance metric measured over time within the specified evaluation interval to derive representative average perfor-

TABLE 1

| Metric | Sample Point | Decision Supported |
| --- | --- | --- |
| Active - Amount of time during which >0 commands were outstanding from host | A | 1) Is there a Bottleneck?<br>7) Upgrade improve performance? |
| SCSI Queue Max - Maximum SCSI wait queue size per device | D | 3) Rebalance Disks?<br>4) Additional Disks Help? |
| Host Read Blocks - Total number of blocks read by host | B | 1) Is there a Bottleneck?<br>5) More controller RAM?<br>7) Upgrade improve performance? |
| Host Write Blocks - Total number of blocks written by host | B | 1) Is there a Bottleneck?<br>5) More controller RAM?<br>7) Upgrade improve performance? |

Performance metrics can be measured anywhere in the data storage system. For instance, samples are taken at point C for a performance metric concerned with the maximum host wait queue size.

Returning to FIG. 3, at step 56, a performance history based upon the user's storage activity is constructed. The mance metrics. These averaged values can then be compared to respective specification thresholds to determine if the performance metrics are "in spec". Apart from averaging, other more complex techniques for combining the samples among multiple performance metrics and filtering them to derive composite metrics may be used.

The following table 2 lists two example metric determinations. The "SCSI Queue" result is determined from a simple evaluation of the performance metric "SCSI Queue Max", whereas the "Bandwidth" result is an example composite metric which consists of a combination of raw performance metrics "Host Read Blocks", "Host Write Blocks", and "Active Time" that have been sampled.

TABLE 2

| Name | Metric | Spec | Out of Spec | Decision Supported |
|---|---|---|---|---|
| SCSI Queue | SCSI Queue Max | 0–1 | $\geq 3$ | 4) Additional Disks Help? |
| Bandwidth | {(Host Read Blocks + Host Write Blocks)*512} ÷ Active Time | $10^6$ | $10^7$ | 1) Is there a Bottleneck? |

Another approach is to ascertain an extent to which the performance metrics are "in spec" or "out of spec". This can be accomplished by providing multiple thresholds or tolerance computations for each performance metric which have different degrees of compliance associated therewith. The sampled performance metric is compared to the various thresholds to determine the degree of noncompliance based upon which of the thresholds or tolerance computations the sampled performance metric satisfies. Different conclusions regarding operation of the data storage system might be drawn depending upon how "out of spec" the performance metric is.

If the performance metrics are in compliance with the specification (i.e., the "yes" branch from inquiry step 64 in FIG. 3), the data storage system is operating at a level of optimal performance. The performance analysis utility resident in computer station 12 returns comments stating that all is well for display on the visual display monitor 18 (step 66). This feedback informs the user that no modifications are necessary.

Conversely, if one or more performance metrics are not in compliance with the specification, but instead are "out of spec" (i.e., the "no" branch from inquiry step 64), the data storage system provides suggestions to the user that would help improve performance (step 68). Such suggestions are chosen from a list of possible suggestions based upon which of the one or more performance metrics are "out of spec", and if capable, the degree to which they are "out of spec".

One way to arrive at the appropriate suggestions is to list the predetermined suggestions in a table and correlate them with the performance metric. Table 3 provides an example correlation between the performance metric determinations "SCSI Queue" and "Bandwidth" from Table 2 (as well as others) and the suggestions.

TABLE 3

| Out of Spec | In Spec | Suggestions |
|---|---|---|
| SCSI Queue | Max Drives | Heavy workload for drives. If condition persists, add drives. |
| SCSI Queue Max Drives | | Heavy workload for storage system. If condition persists, consider adding more storage systems or upgrading to larger storage system. |
| Bandwidth | Host Setting | Host data bandwidth may be inhibiting optimal performance. Adjust host setting. |
| Bandwidth | Host Setting | Storage system has inadequate bandwidth for host demand. Upgrade to higher end storage system |

Once one or more suggestions are chosen given the conditions of the performance metrics, the suggestions are displayed to the user via the host computer visual display monitor 18 (step 70). An example performance planning suggestions screen 106 is shown in FIG. 6. This screen relates to the performance history shown in FIG. 5. This screen displays a suggestion "More DRAM would improve performance", and further lists the indications that led to that suggestion. Notice that the cache utilization metric is "out of spec", indicating that a write cache is too full. It is further noted that the DRAM installed is not at maximum. The other indications show normal operation. Based upon these findings, the conclusion of adding more DRAM to improve performance is suggested. From this suggestion, the user can now make an informed decision to add more DRAM or forego adding more DRAM.

If the user would like to evaluate the raw performance metrics which underlie the suggestion to add more DRAM, the next step 72 (FIG. 3) is to display the performance metrics themselves on the visual display monitor 18. An example screen 108 of performance metrics is shown in FIG. 7. Performance metrics concerning "Relocate", "Working Set", "Cache Utilization", "Drive Q", and "Read Multi" are presented. The same evaluation interval from 9:00 am to 11:00 pm on May 30 is bounded by vertical lines 102 and 104.

This bar graph provides the processed data samples extracted during this period of time to provide positive support for the suggestions being provided to the user. Notice, for example, that the cache utilization metric is relatively high in the evaluation interval, and thus yields a finding of "out of spec" which led to the conclusion of adding more DRAM. The user might wish to evaluate various intervals to see if the new averaged metric is still "out of spec", Notice that each screen in FIGS. 5–7 include buttons 110, 112, and 114 to quickly reference the performance history screen 100, the suggestions screen 106, or the performance metrics screen 108, respectively. These three screens provide the user with a wealth of information to help him or her identify areas for performance improvement in the data storage system. They also assist the user in anticipating future storage requirements for timely upgrades.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method for identifying areas for performance improvement in a data storage system, the method comprising the following steps:

sampling a performance metric during operation of the data storage system;

presenting to a user a performance history that is indicative of how the data storage system is performing over a period of time;

permitting the user to select an evaluation interval of the performance history;

determining whether the performance metric is at a level for optimal performance of the data storage system for the selected evaluation interval; and based upon said determination of the performance metric for the selected evaluation interval providing at least one suggestion to the user that would help improve performance of the data storage system in the event that the performance metric is not at the level for optimal performance.

2. A method according to claim 1 wherein the presenting step comprises displaying the performance history on a display screen.

3. A method according to claim 1 further comprising displaying the suggestion on a display screen.

4. A method according to claim 1 further comprising graphically displaying the performance metric on the display screen.

5. A method according to claim 1 wherein the presenting step comprises graphically displaying the performance history on a display screen and the permitting step comprises permitting the user to select an evaluation interval of the performance history by allowing graphical manipulation of an interval region overlaid on the performance history.

6. A method according to claim 1 wherein the determining step comprises ascertaining an extent to which the performance metric is not at the level for optimal performance.

7. A method according to claim 1 wherein the determining step comprises averaging the samples of the performance metric measured over time to derive a representative average performance metric.

8. A method according to claim 1 wherein the determining step comprises:

combining the samples of the performance metric measured over time; and filtering the combined samples to derive a representative value indicative of the performance metric.

9. A method for identifying areas for performance improvement in a data storage system, the method comprising the following steps:

defining multiple performance metrics that can be measured during operation of the data storage system;

providing a specification for the performance metrics whereby the data storage system is operating at optimal performance when the performance metrics are in compliance with the specification;

sampling the performance metrics during operation of the data storage system;

constructing a performance history that is indicative of how the data storage system is performing over a period of time based upon storage demands imposed by a user;

presenting the performance history to the user;

enabling the user to select an evaluation interval of the performance history;

determining whether any performance metric is not in compliance with the specification for the selected evaluation interval; and in the event that one or more performance metrics are not in compliance with the specification, providing suggestions that would help improve performance of the data storage system based upon which of the one or more performance metrics are not in compliance with the specification for the selected evaluation interval.

10. A method according to claim 9 further comprising displaying the suggestions on a display screen.

11. A method according to claim 9 further comprising graphically displaying one or more performance metrics on the display screen.

12. A method according to claim 9 wherein the specification includes a threshold for individual performance metrics; and the determining step comprises averaging individual performance metrics for the evaluation interval and comparing the averaged performance metrics with their respective thresholds.

13. A method according to claim 9 wherein the determining step comprises ascertaining an extent to which one or more performance metrics are not in compliance with the specification.

14. A method according to claim 9 wherein the specification includes multiple thresholds for individual performance metrics; and the determining step for individual performance metrics comprises:

averaging the performance metric for the evaluation interval;

comparing the averaged performance metric to the multiple thresholds; and computing degree of noncompliance based upon which of the multiple thresholds the performance metric exceeds.

15. A method according to claim 9 wherein:

the presenting step comprises graphically displaying the performance history on a display screen; and the enabling step comprises graphically overlaying an interval region on the performance history and permitting the user to select the evaluation interval by graphically manipulating the interval region.

16. A method according to claim 9 further comprising:

listing multiple predetermined suggestions in a table which correlates the suggestions to the performance metrics; and the suggestions providing step comprises extracting one or more suggestions from the table based upon which of the one or more performance metrics are not in compliance with the specification.

* * * * *